(12) United States Patent
Lesbroussart et al.

(10) Patent No.: US 11,697,347 B2
(45) Date of Patent: Jul. 11, 2023

(54) MOTOR VEHICLE INSTRUMENT CLUSTER WITH REFLECTIVE PANEL

(71) Applicant: PSA AUTOMOBILES SA, Poissy (FR)

(72) Inventors: Antoine Lesbroussart, Montigny le Bretonneux (FR); Vincent Laine, Les Clayes sous Bois (FR); Thomas Bouveret, Chaville (FR); Guillaume Godart, Gambais (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 17/790,303

(22) PCT Filed: Dec. 2, 2020

(86) PCT No.: PCT/FR2020/052239
§ 371 (c)(1),
(2) Date: Jun. 30, 2022

(87) PCT Pub. No.: WO2021/148727
PCT Pub. Date: Jul. 29, 2021

(65) Prior Publication Data
US 2023/0037721 A1 Feb. 9, 2023

(30) Foreign Application Priority Data

Jan. 21, 2020 (FR) ...................................... 2000566

(51) Int. Cl.
*B60K 37/02* (2006.01)
(52) U.S. Cl.
CPC .......... *B60K 37/02* (2013.01); *B60K 2370/23* (2019.05); *B60K 2370/31* (2019.05); *B60K 2370/341* (2019.05)

(58) Field of Classification Search
CPC .... G02B 27/01; G02B 27/0101; B60K 37/02; B60K 37/04
See application file for complete search history.

(56) References Cited

U.S. PATENT DOCUMENTS

| 10,227,007 B1 | 3/2019 | Wagle et al. |
| 2005/0007301 A1* | 1/2005 | Kato ...................... G01D 11/28 |
| | | 358/3.06 |

(Continued)

FOREIGN PATENT DOCUMENTS

| DE | 102004054769 B4 * | 12/2016 | ............. B60K 37/02 |
| FR | 3051406 A1 | 11/2017 | |

(Continued)

OTHER PUBLICATIONS

Ishii et al., Headup Display Device for Vehicle, Sep. 11, 2008, EPO, JP 2008-209724 A, Machine Translation of Description (Year: 2008).*

(Continued)

*Primary Examiner* — James A English
(74) *Attorney, Agent, or Firm* — Sandberg Phoenix & von Gontard PC

(57) ABSTRACT

The invention relates to a motor vehicle instrument cluster, comprising a digital display screen which is intended to be hidden from the vehicle passengers and capable of displaying a source image containing a multitude of indicator modules for the driver of the vehicle, and a panel (20) located below the digital display screen, at least the main central (20A) and upper (20B) portions of said panel being opaque and reflective, the panel (20) being inclined relative to the display screen so as to reflect the source image towards the driver so that the latter perceives, in his/her field of vision, a virtual image located in front of the panel (20), (Continued)

characterized in that the lateral (20C) and lower (20D) portions of the panel (20) are transparent.

12 Claims, 2 Drawing Sheets

(56) References Cited

U.S. PATENT DOCUMENTS

| | | | |
|---|---|---|---|
| 2009/0278676 A1* | 11/2009 | Kiesewetter | G02B 27/0101 340/461 |
| 2020/0057514 A1* | 2/2020 | Fujii | B32B 27/30 |
| 2020/0196481 A1* | 6/2020 | Ehmke | G02F 1/133385 |
| 2021/0034100 A1* | 2/2021 | Lesuffleur | H01L 33/44 |

FOREIGN PATENT DOCUMENTS

| | | | |
|---|---|---|---|
| FR | 3074925 A1 | 6/2019 | |
| FR | 3056771 B1 * | 10/2019 | ............. G02B 27/01 |
| JP | 2008209724 A * | 9/2008 | |
| WO | 2016092220 A1 | 6/2016 | |

OTHER PUBLICATIONS

Christophe Dubose, Driving Assistance Device for a Motor Vehicle, Oct. 11, 2019, EPO, FR 3 056 771 B1, Machine Translation of Description (Year: 2019).*

Kiesewetter et al., Built-in instrument cluster for a motor vehicle, May 18, 2006, EPO, DE 10 2004 054 769 A1, Machine Translation of Description (Year: 2006).*

International Search Report for PCT/FR2020/052239 dated Mar. 22, 2021.

Written Opinion for PCT/FR2020/052239 dated Mar. 22, 2021.

* cited by examiner

MOTOR VEHICLE INSTRUMENT CLUSTER WITH REFLECTIVE PANEL

CROSS-REFERENCE TO RELATED APPLICATIONS

This application is the US National Stage under 35 USC § 371 of International Application No. PCT/FR2020/052239, filed 2 Dec. 2020 which claims priority to French Application No. 2000566 filed 21 Jan. 2020, both of which are incorporated herein by reference.

BACKGROUND

The present invention relates to a motor vehicle instrument cluster.

Instrument clusters are devices generally integrated into the dashboard of a motor vehicle to provide the driver with a multitude of data relating to the operation of a motor vehicle, such as, for example, its instantaneous and average speeds, its engine speed, its fuel level or even its average consumption. They also make it possible to display warning signals (e.g., excessive engine temperature, insufficient oil level, or failure to close a door) and warning lights indicating the activation of certain vehicle devices (e.g., turn signals, handbrake, position lights, or dipped-beam or main-beam headlights).

Formerly composed of a plurality of analog dials with needles associated with indicator lights, these instrument clusters are now mainly made up of rectangular active-matrix LCD digital display screens (TFT-LCD) of the same type as—found on televisions and computer monitors.

These clusters, which offer very good image quality in terms of resolution, contrast and brightness, can also be configured by the vehicle's driver via controls located on the steering wheel or below the display panel. The driver can therefore choose, at least in part, the modules that he wishes to see displayed on the screen as well as their style and the background environment.

Unfortunately, incorporating such a large rectangular flat screen within a dashboard causes a substantial limitation of the possibilities in terms of style and thus imposes a particularly significant integration effort in the design phase of this dashboard.

FR3074925 A1 discloses a motor vehicle instrument cluster comprising a digital display screen that is intended to be hidden from the vehicle passengers, which is capable of displaying a source image containing a multitude of indicator modules for the driver of said vehicle, and which includes an opaque reflective panel located below said digital display screen that is inclined relative to the digital display screen so as to reflect said source image toward said driver so that the driver perceives, in his field of vision, a virtual image located in front of said panel.

Such an instrument cluster has the advantage of being able to be integrated more harmoniously into any type of motor vehicle dashboard, since the shape and size of the reflective panel can be varied almost without limit to best match the configuration and style of this dashboard.

The opaque nature of its panel also makes it possible to ensure a high-contrast view by the driver of the information contained in the source image, as well as to hide the support means for connecting this panel to the vehicle dashboard from the driver's eyes.

However, in use the driver's gaze tends to be disturbed by the sudden transition between the opaque panel and the bottom wall of the dashboard located in two planes that are longitudinally offset from one another.

SUMMARY

This invention therefore aims to improve the situation.

To this end a motor vehicle instrument cluster is disclosed comprising a digital display screen that is intended to be hidden from the vehicle passengers which is capable of displaying a source image containing a multitude of indicator modules for the driver of said vehicle, and which includes a panel located below the digital display screen, at least the main central and upper portions of said panel being opaque and reflective, said panel being inclined relative to said display screen so as to reflect said source image toward said driver so that the—driver perceives, in his field of vision, a virtual image located in front of said panel, —wherein the lateral and lower portions of said panel are transparent.

The fact that the lateral and lower portions of the panel are transparent makes it possible to obtain a less pronounced transition between the panel of this cluster and the bottom wall of the dashboard located in front of this panel, while giving this same panel a particularly esthetic impression of buoyancy.

These lateral and lower portions of the panel also make it possible to highlight the coating of the bottom wall of this dashboard, a larger surface of which is visible to the driver.

According to preferred features of said instrument cluster:
said transparent lateral and bottom portions have a width of at least 20 mm;
said transparent lateral and lower portions are separated from said opaque main central portion by transition zones, the degree of opacity of which varies according to a gradient ranging from transparent to opaque;
said cluster also has a frame comprising a base bearing said digital display screen as well as a support connected to said base and bearing said panel, said support extending in front of and opposite the main central and upper opaque portions of said panel so as to remain invisible to the driver;
said lateral and lower portions of said panel are also reflective;
said cluster comprises a plurality of transparent informational symbols provided on the opaque upper portion of said panel, as well as lighting means affixed against the front face of this opaque upper portion of said panel so as to provide backlighting of said informational symbols;
said panel is formed of a translucent substrate bearing an opaque coating on its front face and a reflective coating on its rear face;
said transparent informational symbols are produced by scraping or laser ablation of said opaque coating; and/or
said cluster also comprises additional lateral display modules arranged on a bottom wall of the dashboard located in front of said panel, so as to be visible to said driver of the vehicle through the two said transparent lateral portions of this panel.

Also disclosed is a motor vehicle comprising such an instrument cluster.

DESCRIPTION OF THE FIGURES

The description of the invention will now continue with the detailed description of an embodiment, given hereinafter by way of illustration but not limitation, with reference to the appended drawings, wherein.

DETAILED DESCRIPTION

Figure 1:
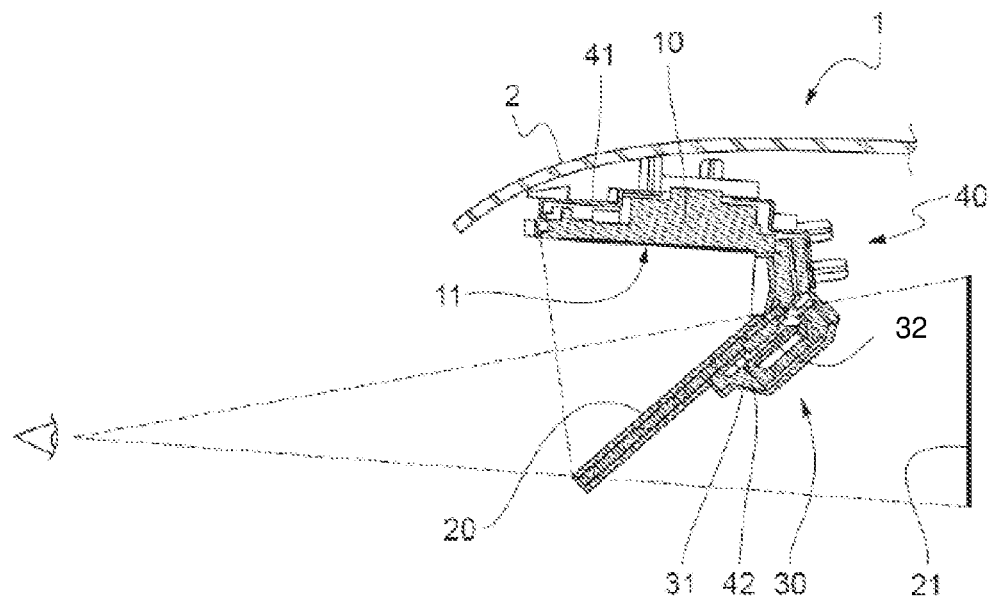
FIG. 1 shows a schematic sectional view of a digital instrument cluster integrated int the dashboard of a motor vehicle.

The digital instrument cluster 1 shown in FIG. 1 is intended to be integrated into the dashboard of a motor vehicle in the axis of the steering wheel in order to provide the driver with a multitude of data relating to the operation of this vehicle (for example, its instantaneous and average speeds, its engine speed, its fuel level or even its average consumption), but also to display warning signals (such as, excessive engine temperature, insufficient oil level or even failure to close a door) and warning lights signaling the activation of certain vehicle devices (such as, indicators, handbrake, position lights, or dipped-beam or main-beam headlights).

In the following description and by convention, the terms "lower," "upper," "longitudinal" and "lateral" will be defined with respect to the mounting position of this instrument cluster 1 on such a vehicle.

Furthermore, the use of the term "substantially" indicates that a slight deviation is allowed with respect to a predetermined nominal position or arrangement, while remaining included within the scope of the invention. For example, "substantially horizontal" indicates that a deviation of the order of 10 to 15° relative to a strictly horizontal orientation is permitted within the scope of the invention.

The digital instrument cluster 1 comprises a digital display screen 10, a reflective panel 20 and lighting means 30.

As illustrated in FIG. 1, the digital display screen 10 extends substantially horizontally under the cover 2 of the dashboard of the vehicle so as to be hidden from the eyes of the driver of the vehicle, with its display face facing the floor of this vehicle.

This display screen 10 advantageously comprises a rectangular liquid-crystal panel with a matrix of thin-film transistors, commonly referred to by the acronym TFT-LCD (for "thin-film-transistor liquid-crystal display"). This type of screen in fact has a low cost price as well as a sufficiently high luminosity for the implementation of the—instrument cluster.

As a variant, the display screen 10 could be—comprised of an active-matrix organic light-emitting diode panel, commonly referred to by the acronym AMOLED (for "Active-Matrix Organic Light-Emitting Diode"), or even by an e-ink panel.

The digital display screen 10 is connected to a graphic computer, not shown in the figures, which sends to the display screen a source image 11 in real time comprising a certain number of indicator modules (e.g., central instantaneous speed module, FM radio module, fuel gauge module, rev counter module, etc.) drawn in a certain style (for example "classic," reproducing the display of analog or "digital" dials, in which all the information is displayed in the form of digital numbers).

This source image 11, which is not directly visible to the driver due to the layout of the screen 10, is updated in real time according to the—cycling of the data collected by the built-in systems interface (BSI) of the vehicle to which this graphic computer is connected. It is also configurable by the driver of the vehicle using controls located for example on the steering wheel, so that the—driver can at least partially select the indicator modules to be displayed and choose the style to apply to—indicators.

Located in the driver's axis of vision and below the digital display screen 10, the reflective panel 20 is inclined at an acute angle of between 30° and 60° (advantageously equal to 45°) with respect to the screen 10 so as to reflect the source image 11 displayed on this screen toward the driver so that the driver then perceives a virtual image 21 thereof in his field of vision in front of this reflective panel 20 and inclined at the same angle with respect to the panel (this virtual image 21 thus extending substantially vertically when the angle of inclination between the screen 10 and the panel 20 is equal to 45° as illustrated in FIG. 1).

As a variant, the panel can be curved in order to modify the reflection angle of the incident light rays coming from the source image so as to modulate the size and the display plane of the virtual image.

Figure 2:
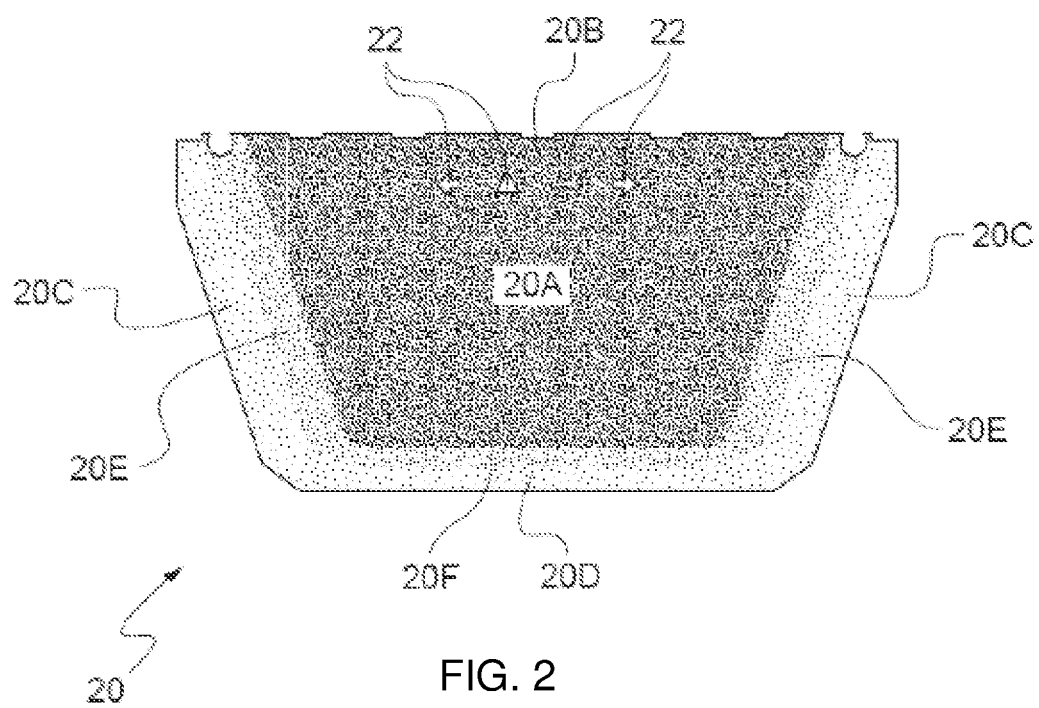
FIG. 2 is a front view of the panel comprised by the digital instrument cluster.
Figure 3:
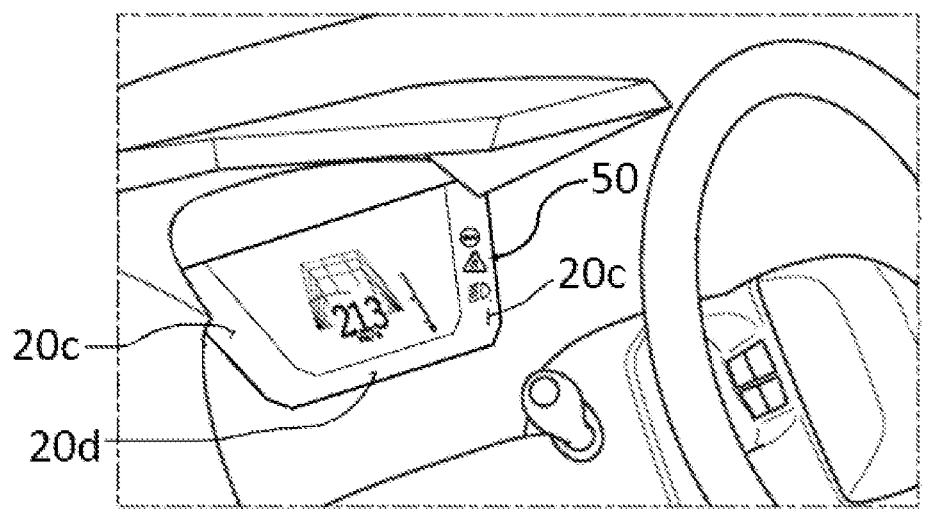
FIG. 3 is an angled view of the dashboard showing an additional lateral display module visible through a transparent lateral portion of a panel of the instrument cluster.

Shown alone in FIG. 2, the panel 20, which here has the shape of an isosceles trapezium, is formed by a transparent substrate bearing an opaque black coating on its front face and a reflective coating on its rear face.

The transparent substrate is advantageously molded from a thermoplastic material such as polymethyl methacrylate (PMMA) or polycarbonate (PC). It can also be made of glass.

Preferably produced by depositing material on the rear face of the translucent substrate, the reflective coating has a reflectivity coefficient of at least 30% (advantageously between 30 and 60%) so that the generated virtual image 21 is sufficiently bright.

As a variant, this reflective coating can also be obtained by a method of surface treatment of the rear face of the transparent substrate.

Advantageously affixed by screen printing on the front face of the transparent substrate, the opaque black coating extends over the main central 20A and upper 20B portions of the panel 20, but not over its lateral 20C and lower 20D portions, which therefore remain transparent, so as to ensure a less pronounced transition between this panel 20 and the bottom wall of the dashboard located in front of this panel, while giving this same panel a particularly esthetic impression of buoyancy.

These transparent lateral 20C and lower 20D portions advantageously have a width of at least 20 mm so as to ensure an optimal floating effect for the panel 20.

Moreover, and in order to facilitate the accommodation of the driver's eyes, the latter are also preferably separated from the main central 20A and upper 20B portions of the panel 20 by transition zones 20E, 20F whose degree of opacity varies according to a gradient from transparent to opaque.

As can be seen in FIG. 2, the upper portion 20B of the panel 20 incorporates a plurality of informational symbols 22 produced by scraping or laser ablation of the opaque black coating.

As is the case on the panel shown in FIG. 2, these informational symbols 22 can be constituted by pictograms in this case embodying the use of flashing lights for changing direction, the presence of a danger and the scheduled maintenance alert.

These informational symbols 22 can also be made up of other types of pictograms, words or letters embodying functions in progress or alerts emitted by the vehicle (signaling lights, temperature or fuel gauge, airbag, etc.).

The reflective and opaque coatings affixed respectively to the rear and front faces of the panel 20 can also each be covered with an anti-reflective and/or anti-scratch varnish, or even with a coating facilitating their cleaning.

The lighting means 30 comprise a casing 31 affixed against the front face of the opaque upper portion 20B of the panel 20 and housing a printed circuit board 32 on which a plurality of light-emitting diodes are arranged that ensure the backlighting of the informational symbols 22 arranged on the panel 20.

These diodes are supplied selectively so that one or more informational symbol(s) 22 appear(s) selectively illuminated on the panel 20 according to the control commands received by the board and transmitted by the built-in systems interface (BSI) of the vehicle.

Spacers, also not visible in FIG. 1, are interposed between the printed circuit board 31 and the panel 20 in order to compartmentalize the various lighting zones, each spacer being associated with a respective informational symbol 22 and to prevent light leaks.

Because it is affixed against an opaque portion of the rear face of the panel 20, the lighting unit 31 is entirely hidden from the eyes of the vehicle's passengers, and in particular from those of the driver.

It will be noted that the lighted informational symbols 22 located in the plane of the panel 20 appear, in the eyes of the vehicle's driver, longitudinally offset toward the front with respect to the information present in the virtual image 21, which makes it possible to prioritize the display of these symbols associated with essential information.

The digital instrument cluster 1 also comprises a frame 40 comprising a substantially horizontal base 41 bearing the digital display screen 10, as well as a support 42 extending below this base 41 and bearing the reflective panel 20.

The base 41 comprises attachment means making it possible to rigidly secure the instrument cluster 1 to the cover 2 of the vehicle dashboard. It will be noted that the support 42 bearing the panel 20 extends in front of and opposite the opaque main central 20A and upper 20B portions of this panel 20 so as to remain invisible to the driver.

According to variant embodiments not shown, the support 42 of the frame 40 is pivotally mounted with respect to the base 41. Motorized means are also provided to adjust its inclination (and therefore the inclination of the panel 20) in order to adapt to the position of the driver's eyes so that the driver can view the entire virtual image 21 generated by the instrument cluster 1.

According to yet other variant embodiments not shown, the instrument cluster may also comprise additional lateral display modules 50 arranged on a bottom wall of the dashboard located in front of the panel 20, so as to be visible to the driver through the two transparent lateral portions 20c of this panel.

The invention claimed is:

1. An instrument cluster for a motor vehicle comprising:
a generally horizontally oriented, downwardly directed digital display screen that is intended to be hidden from the vehicle passengers and which is adapted to display a source image containing a multitude of indicator modules for the driver of said vehicle, and
a panel located below the digital display screen, said panel comprising a main central portion, a main upper portion, a lower portion, and lateral portions; wherein at least the main central portion and main upper portion of said panel are opaque and reflective and said lateral and lower portions are, and remain, transparent, said panel being inclined relative to said display screen so as to reflect said source image toward said driver so that the driver perceives, in his field of vision, a virtual image located in front of said panel, said virtual image being inclined relative to said panel at an angle substantially equal to an angle defined by said panel and said display screen.

2. The instrument cluster according to claim 1, wherein said transparent lateral and bottom portions have a width of at least 20 mm.

3. The instrument cluster according to claim 1, wherein said transparent lateral and lower portions are separated from said opaque main central portion by transition zones whose degree of opacity varies according to a gradient ranging from opaque to transparent from said main central portion to said lateral and lower portions.

4. The instrument cluster according to claim 1, wherein said instrument cluster also comprises a frame comprising a base bearing said digital display screen as well as a support connected to said base and bearing said panel, said support extending in front of and opposite the main central and upper opaque portions of said panel so as to remain invisible to the driver.

5. The instrument cluster according to claim 1, wherein said lateral and lower portions of said panel are also reflective.

6. The instrument cluster according to claim 1, wherein said opaque upper portion of said panel defines a plurality of transparent informational symbols, said instrument cluster further comprising lighting means affixed against the front face of this opaque upper portion of said panel so as to provide backlighting of said informational symbols, said lighting means being configured to selectively illuminate one or more of said informational symbols.

7. The instrument cluster according to claim 6, wherein said panel is formed of a translucent substrate bearing an opaque coating on its front face and a reflective coating on its rear face.

8. The instrument cluster according to claim 7, wherein said transparent informational symbols are produced by scraping or laser ablation of said opaque coating.

9. The instrument cluster according to claim 1, wherein said instrument cluster further comprises additional lateral display modules arranged on a bottom wall of the dashboard located in front of said panel, so as to be visible to said driver of the vehicle through said transparent lateral portions of the panel.

10. A motor vehicle comprising said instrument cluster according to claim 1.

11. An instrument cluster for a motor vehicle comprising:
a generally horizontally oriented, downwardly directed digital display screen that is intended to be hidden from the vehicle passengers and which is adapted to display a source image containing a multitude of indicator modules for the driver of said vehicle, and
a panel located below the digital display screen, said panel comprising a main central portion, a main upper portion, a lower portion, and lateral portions, wherein at least the main central portion and the main upper portion of said panel are opaque and reflective and said lateral and lower portions are transparent,
said panel being inclined relative to said display screen so as to reflect said source image toward said driver so that the driver perceives, in his field of vision, a virtual image located in front of said panel, said instrument cluster further comprising a plurality of transparent informational symbols provided on the opaque upper portion of said panel and lighting means affixed against a front face of the opaque upper portion of said panel so as to provide backlighting for said informational symbols, whereby said plurality of informational symbols can be individually illuminated.

12. A motor vehicle comprising a dashboard, a steering wheel, and a digital instrument cluster integrated into the dashboard in an axis of the steering wheel; the digital instrument cluster comprising:

a digital display screen mounted to said dashboard under a cover of said dashboard to be hidden from the vehicle passengers, said digital display screen facing downwardly and being adapted to display a source image containing a multitude of indicator modules for the driver of said vehicle, and a panel located below the digital display screen, said panel comprising a main central portion, a main upper portion, a lower portion, and lateral portions; wherein at least the main central portion and main upper portion of said panel are opaque and reflective and said lateral and lower portions are, and remain, transparent, said panel being inclined relative to said display screen so as to reflect said source image toward said driver so that the driver perceives, in his field of vision, a virtual image located in front of said panel.

\* \* \* \* \*